(12) United States Patent
Linderholm et al.

(10) Patent No.: US 6,663,327 B2
(45) Date of Patent: Dec. 16, 2003

(54) NUMERICALLY CONTROLLED ORBITAL MACHINING APPARATUS

(75) Inventors: Dag G. Linderholm, Rönninge (SE); Göran Roswall, Hässelby (SE); Joakim Nygren, Vällingby (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/198,875

(22) Filed: Jul. 19, 2002

(65) Prior Publication Data

US 2003/0017017 A1 Jan. 23, 2003

Related U.S. Application Data

(60) Provisional application No. 60/306,844, filed on Jul. 20, 2001.

(51) Int. Cl.[7] .................................................. B23C 1/00
(52) U.S. Cl. ......................... 409/190; 409/74; 409/200
(58) Field of Search ........................... 409/74, 190, 200

(56) References Cited

U.S. PATENT DOCUMENTS

| | | | | |
|---|---|---|---|---|
| 4,423,991 A | * | 1/1984 | Derr, Jr. ..................... | 409/200 |
| 4,934,040 A | * | 6/1990 | Turchan ..................... | 29/566 |
| 5,429,459 A | * | 7/1995 | Palm .......................... | 409/66 |
| 5,536,152 A | * | 7/1996 | Kawahara et al. ......... | 418/55.5 |
| 5,971,678 A | * | 10/1999 | Linderholm ............... | 409/132 |
| 6,382,890 B1 | * | 5/2002 | Linderholm ............... | 409/191 |

* cited by examiner

*Primary Examiner*—A. L. Wellington
*Assistant Examiner*—Dana Ross
(74) *Attorney, Agent, or Firm*—Taylor & Aust, P.C.

(57) ABSTRACT

An orbital machining apparatus for producing a hole in a workpiece using a cutting tool and including a first actuator for rotating the cutting tool about its longitudinal center axis, a second actuator for moving the cutting tool in an axial feed direction, a third actuator for rotating the cutting tool about a principal axis and a radial offset mechanism. The radial offset mechanism includes an inner cylindrical body having an eccentric cylindrical hole and which supports a spindle unit, the inner cylindrical body radially supported in an eccentric cylindrical hole of an outer cylindrical body to adjust the radial distance of the cutting tool longitudinal center axis from the principal axis. The third actuator includes first and second motors which rotate the outer and inner cylindrical bodies, respectively, in synchronism to maintain a mutual rotary position thereof to keep a cutting tool radial offset position unchanged during operation.

4 Claims, 4 Drawing Sheets

NUMERICALLY CONTROLLED ORBITAL MACHINING APPARATUS

CROSS REFERENCE TO RELATED APPLICATIONS

This is a non-provisional application based upon U.S. provisional patent application Ser. No. 60/306,844, entitled "NUMERICALLY CONTROLLED SPINDLE UNIT FOR ORBITAL DRILLING", filed Jul. 20, 2001.

BACKGROUND OF THE INVENTION

1. Field of the Invention

The invention generally relates to a numerically controlled orbital machining apparatus for producing a hole in a workpiece by means of a cutting tool rotating about its own tool axis as well as eccentrically (orbiting) about a principal axis corresponding to the longitudinal center axis of the hole to be machined. More particularly, the invention relates to an improved mechanism of the apparatus for adjusting the radial offset (orbit radius) of the cutting tool axis relative to the principal axis.

2. Description of the Related Art

WO 99/62661 discloses an apparatus for machining a hole in a workpiece wherein the apparatus includes a spindle motor that rotates a cutting tool about its own center axis and wherein the cutting tool can rotate eccentrically about a principal axis corresponding to the longitudinal center axis of the hole. The apparatus includes a mechanism for adjusting the radial offset of the tool axis relative to the principal axis. Although the radial offset adjustment mechanism is configured such as to make it possible to change the radial offset during machining such that conical holes may be formed while simultaneously rotating the cutting tool about its own center axis and feeding the cutting tool axially into the workpiece, this mechanism is somewhat structurally complex and occupies a relatively large space in the longitudinal direction. The spindle motor is protruding substantially in a cantilevered manner from supporting structures of the apparatus, which may affect the precision of the machining results of the holes produced thereby.

SUMMARY OF THE INVENTION

It is an object of the invention to provide an improved and structurally simpler and a more compact radial offset adjustment mechanism of the present invention which is configured to allow a continuous radial offset adjustment of the cutting tool while simultaneously performing an orbital movement thereof about the principal axis and moving it in an axial feed direction into the workpiece, thereby making it possible to produce not only cylindrical holes or recesses but also holes or recesses having a conical or tapered configuration or sections thereof by using a substantially cylindrically shaped cutting tool.

For this purpose the apparatus of the present invention a first actuator configured for rotating the cutting tool about its longitudinal center axis during the machining of the hole;

a second actuator configured for moving the cutting tool in an axial feed direction substantially parallel to the tool axis, the second actuator being simultaneously operable with the first actuator;

a third actuator configured for rotating the cutting tool about a principal axis, the principal axis being substantially parallel to the center axis of the tool and coaxial with a longitudinal center axis of the hole to be machined, the third actuator being simultaneously operable with the first and second actuators; and a radial offset mechanism configured for controlling the radial distance of the center axis of the cutting tool from the principal axis, wherein the radial offset mechanism includes: an inner cylindrical body having an eccentric cylindrical hole, the eccentric hole having a longitudinal center axis that is parallel to and radially offset from a longitudinal center axis of the inner body, the eccentric hole being configured to radially and rotatably support a spindle unit for operating the cutting tool; and an outer cylindrical body having an eccentric cylindrical hole, the eccentric hole of the outer body having a longitudinal center axis that is parallel to and radially offset from a longitudinal center axis of the outer body a distance which is equal to the distance between the center axis of the eccentric hole of the inner body and the center axis of the inner cylindrical body, the inner cylindrical body being radially supported in the eccentric hole of the outer cylindrical body and rotatable therein so as to adjust the radial distance of the center axis of the cutting tool from the principal axis.

A further object of the invention is to provide a radial offset adjustment mechanism of the kind mentioned above, wherein the basic structural configuration of the radial offset adjustment mechanism is such as to allow for an accurate mass balancing of the centrically and eccentrically rotating (orbiting) components of the machining apparatus so that vibrations are eliminated or substantially attenuated during working operations of the apparatus.

For this purpose the inner cylindrical body is configured such that the center of gravity thereof is positioned to match the center of gravity of the spindle unit rotatably supported in the eccentric hole of the inner cylindrical body such that a common center of gravity of the inner cylindrical body and the spindle unit coincides with the center axis of the inner cylindrical body, and wherein the outer cylindrical body is configured such that the center of gravity thereof is positioned to match the common center of gravity of the inner cylindrical body and the spindle unit such that a common center of gravity of the outer cylindrical body and the inner cylindrical body with the spindle unit coincide with the center axis of the outer cylindrical body. Thus, this is made possible owing to the fact that the common center of gravity of the rotating radial offset mechanism and all components rotating together therewith is positioned to coincide, or substantially coincide, with the principal axis, irrespective of the prevailing radial offset of the cutting tool.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
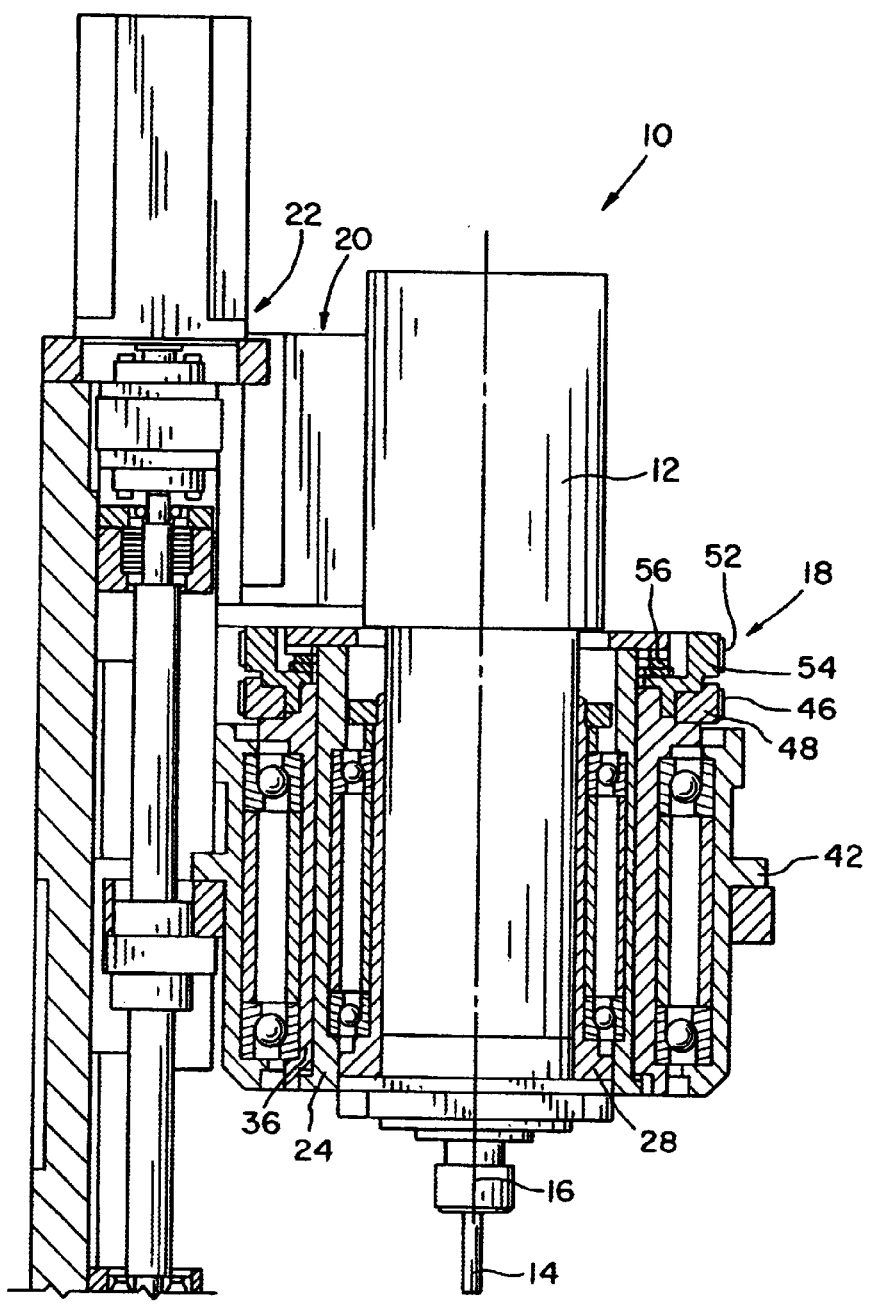
FIG. 1 is a schematic side sectional view of an orbital machining apparatus equipped with a radial offset adjustment mechanism according to the invention.

As shown in FIG. 1, the orbital machining apparatus 10 generally includes a spindle motor unit 12 that rotates a cutting tool 14 about its own axis 16, a radial offset mechanism 18, an eccentric rotation mechanism 20 and an axial feed mechanism 22. The apparatus 10 may be mounted in a stationary stand or mounted to a movable member, such as a robot arm.

The radial offset mechanism 18 of the invention basically includes an inner hollow cylindrical body 24 rotatably supporting the spindle unit 12 therein. The spindle motor unit 12 is rotatably supported in an eccentric cylindrical hole 26 (FIG. 3) in the cylindrical body 24 via a fixation sleeve 28 (FIG. 1). The eccentric hole 26 has a longitudinal center axis 30 (FIG. 3) that is parallel to but radially offset a distance e from the longitudinal center axis 32 of the cylindrical body 24.

The eccentric inner cylindrical body 24 is, in its turn, rotatably supported within an axially extending eccentric hole 34 of a second, outer hollow cylindrical body 36. The eccentric hole 34 has a longitudinal center axis 38 (FIG. 2) that is parallel to but radially offset a distance e from the center axis 40 of the cylindrical body 36 (the principal axis). Preferably, the holes 26 and 34 of the cylindrical bodies 24 and 36 have the same eccentricity, i.e. the hole center axes 30 and 38 are radially offset the same distance c from the respective center axis 32 and 40 of the bodies 24 and 36. By rotating the inner cylindrical body 24 within the eccentric hole 34 of the outer cylindrical body 36, or by a mutual, relative rotation of the cylindrical bodies 24 and 36, it is thus possible to locate the center axis 30 of the eccentric hole 26 of the inner cylindrical body 24 such that it, and hence the spindle unit 12 and the center axis 16 of the cutting tool 14, will coincide with the center axis 40 of the outer cylindrical body 36. In this case there is no radial offset at all of the cutting tool axis 16. By performing a mutual, relative rotation of 180° of the inner and outer cylindrical bodies 24 and 36 away from this zero radial offset position, a maximum offset of the cutting tool axis 16 is obtained.

Basically, the outer cylindrical body 36 is rotatably supported in a housing 42 of the apparatus 10 and is rotatable by a motor 44 via a belt 46, which engages a belt wheel 48 connected to the outer body 36. Likewise, the inner cylindrical body 24 is rotatable by a further motor 50 via a belt 52, which engages a belt wheel 54 connected to the inner body 24 via a so-called Oldham coupling 56, or any equivalent coupling element, thereby allowing the belt wheel 54 to rotate at a fixed concentric position relative to the belt wheel 48 while generating a rotation of the eccentric inner cylindrical body 24. When the cylindrical bodies 24, 36 are rotated in synchronism, i.e. with the same angular speed by their respective motors 50, 44 and belts 52, 46 during a working operation, no change of the radial offset value e of the tool axis 16 will occur. In combination with an axial feed of the cutting tool 14 into the workpiece (not shown) a cylindrical hole or recess may then be formed therein.

If the inner and outer cylinder bodies 24 and 36 are caused to perform a relative rotation by rotating them in different speeds, the radial offset value e of the cutting tool axis 16 will be changed. This will allow for forming of a conical or tapered hole or section of a hole or recess in the workpiece when combined with an axial feed of the cutting tool 14 into the workpiece.

According to important aspect of the present invention the proposed embodiment of the inner and outer eccentric cylindrical bodies 24 and 36 of the radial offset adjustment mechanism makes it possible to overcome the problem of unbalance, which is normally caused by a non-centric location of the common center of gravity of the rotating and orbiting components of previously known machining apparatuses.

Figure 2:
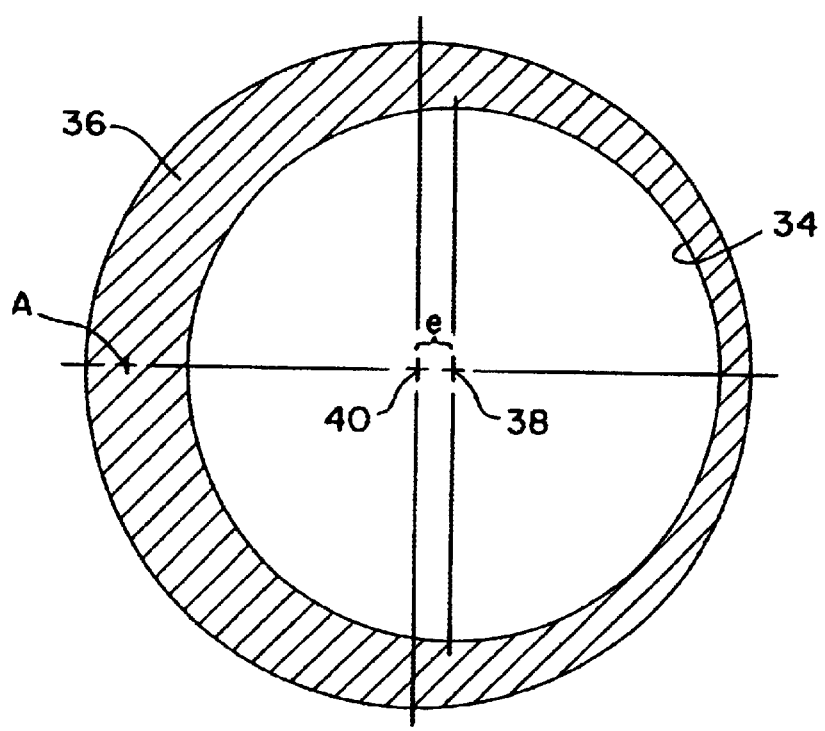
FIG. 2 is a schematic cross-sectional view of an outer cylindrical body of the radial offset adjustment mechanism of the invention.
Figure 3:
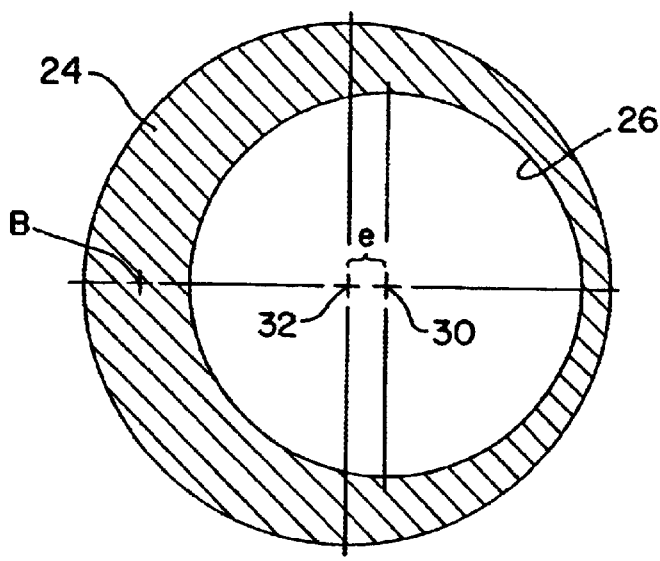
FIG. 3 is a schematic cross-sectional view of an inner cylindrical body of the radial offset adjustment mechanism of the invention.
Figure 4:
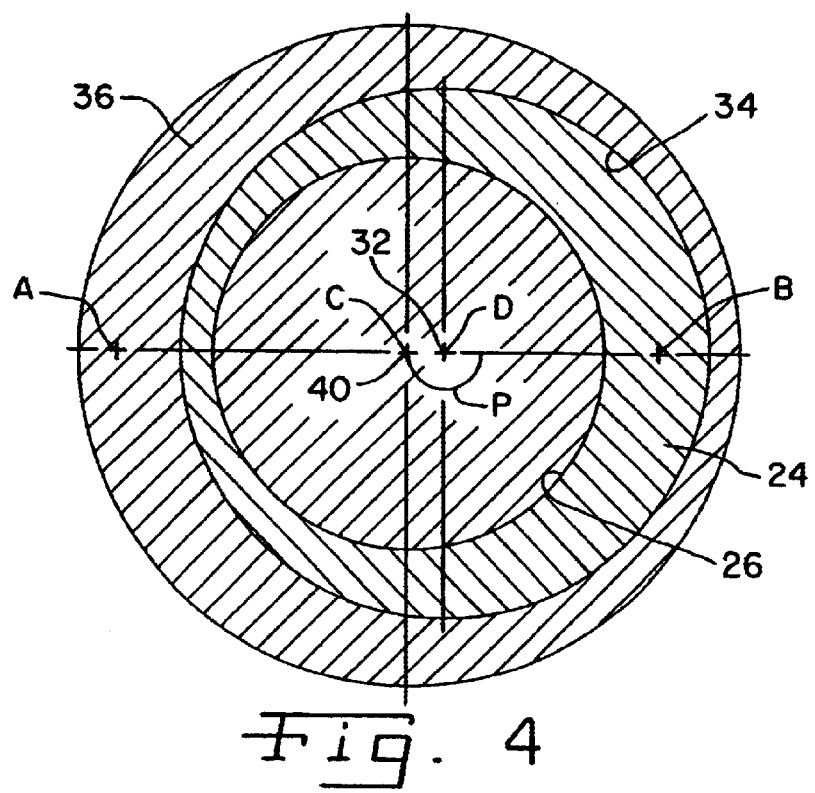
FIG. 4 illustrates in a schematic cross-sectional view the inner cylindrical body located in a position in the eccentric hole of the outer cylindrical body such that the tool axis coincides with center axis of the outer cylindrical body.
Figure 5:
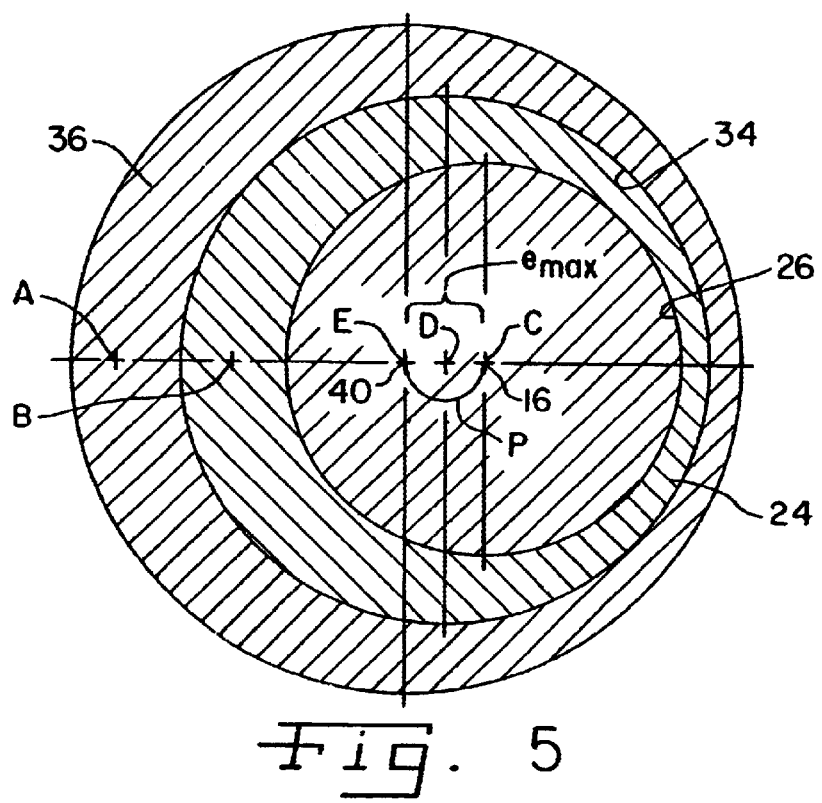
FIG. 5 illustrates in a schematic cross-sectional view the inner cylindrical body located in a position in the outer cylindrical body such that a maximum radial offset of the tool axis is obtained.
Figure 6:
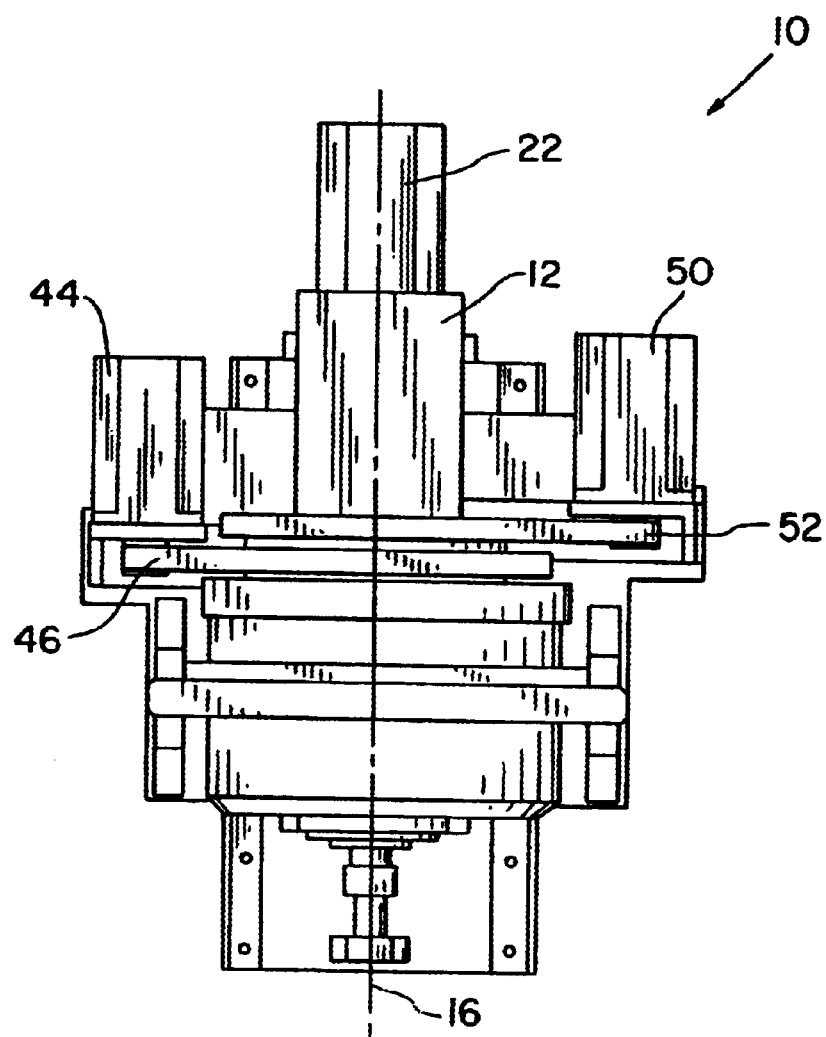
FIG. 6 is a schematic front view of an orbital machining apparatus equipped with a radial offset adjustment mechanism according to the invention.

As shown in FIGS. 2, 4 and 5, the center of gravity of the outer cylindrical body 36 is indicated with A, whereas the center of gravity of the inner cylindrical body 24 is indicated with B in FIGS. 3–5.

Since the eccentricity, or fixed radial offset e, of the hole 34 of the outer cylindrical body 36 from the center axis 40 equals (is the same distance value as) the eccentricity, or fixed radial offset e, of the hole 26 of the inner cylindrical body 24 from the center axis 32, the spindle unit 12 and the cutting tool center axis 16 may be moved along an arcuate path p (FIGS. 4 and 5) by the inner body 24 into a position relative to the outer cylindrical body 36, in which the tool center axis 16 will coincide with the center axis 40 of the outer cylindrical body 36, as shown in FIG. 4, resulting in an radial offset $e_{min}$=0 of the cutting tool axis 16 when rotating both cylindrical bodies 24 and 36 together with the same angular speed, i.e. with no mutual, relative rotation. As shown in FIG. 5 and as mentioned above, a maximum radial offset position $e_{max}$ of the cutting tool axis 16 may be obtained, when the inner cylindrical body 24 is rotated 180° relative to the outer body 36 from the position in FIG. 4.

Owing to the above-mentioned geometric parameters of the two eccentric bodies 24 and 36 it is possible to achieve a fairly accurate balancing of the rotating and orbiting components of the machining apparatus during the operation thereof, irrespective of the prevailing radial offset of the tool axis 16.

Firstly, for this purpose, the weight and the center of gravity B of the inner cylindrical body 24 is adapted to match the weight and center of gravity C of the spindle unit 12 mounted in the hole 26 such that the common center of gravity D of the body 24 and the unit 12 (and all components rotating together therewith) will coincide with the center axis 32 of the inner body 24. Thus, the center of gravity D should remain substantially stationary at the center axis 32 independent on the rotary position of the spindle unit 12 relative to the inner cylindrical body 24. By then adapting the weight and the center of gravity A of the outer cylindrical body 36 such that the common center of gravity E of the outer body 36 and the inner body 24 together with the spindle unit 12 will be located at the center axis 40 of the outer cylindrical body 36 (at the principal axis) it is generally secured that the rotating and orbiting components of the apparatus will be balanced such that substantially no vibrations will be generated during the operation thereof. The rotational speed of the outer cylindrical body 36 and thus the orbiting speed of the cutting tool 14 is normally in the order of 100–300 rpm.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An orbital machining apparatus for producing a hole in a workpiece by means of a cutting tool, said apparatus comprising:

a first actuator configured for rotating the cutting tool about its longitudinal center axis during the machining of the hole;

a second actuator configured for moving the cutting tool in an axial feed direction substantially parallel to said cutting tool longitudinal center axis, said second actuator being simultaneously operable with said first actuator;

a third actuator configured for rotating the cutting tool about a principal axis, said principal axis being substantially parallel to said longitudinal center axis of the tool and coaxial with a longitudinal center axis of the hole to be machined, said third actuator being simultaneously operable with said first and second actuators; and a radial offset mechanism configured for controlling a radial distance of said longitudinal center axis of the cutting tool from said principal axis, said radial offset mechanism comprising:

an inner cylindrical body having an eccentric cylindrical hole, said eccentric cylindrical hole having a longitudinal center axis that is parallel to and radially offset from a longitudinal center axis of said inner cylindrical body, said eccentric hole being configured to radially and rotatably support a spindle unit for operating said cutting tool; and an outer cylindrical body having an eccentric cylindrical hole, said eccentric cylindrical hole of said outer cylindrical body having a longitudinal center axis that is parallel to and radially offset from a longitudinal center axis of said outer cylindrical body, said inner cylindrical body being radially supported in said eccentric cylindrical hole of the outer cylindrical body and rotatable therein so as to adjust the radial distance of said longitudinal center axis of the cutting tool from said principal axis;

said third actuator including both a first motor drivingly connected to said outer cylindrical body for individually rotating said outer cylindrical body about said longitudinal center axis of said outer cylindrical body, and a second motor drivingly connected to said inner cylindrical body for individually rotating said inner cylindrical body about said longitudinal center axis of said inner cylindrical body, both said first motor and said second motor being able to rotate said outer cylindrical body and said inner cylindrical body, respectively, in synchronism to maintain a mutual rotary position thereof to keep a radial offset position of the cutting tool unchanged during a working operation.

2. An apparatus according to claim 1, wherein said first motor and said second motor are able to rotate said outer cylindrical body and said inner cylindrical body, respectively, in different angular speeds so as to vary said radial offset position of the cutting tool.

3. The apparatus of claim 1, wherein said first motor is drivingly connected to said outer cylindrical body through a first belt for rotating a first belt wheel attached to said outer cylindrical body, said second motor is drivingly connected to said inner cylindrical body through a second belt for rotating a second belt wheel connected to said inner cylindrical body through a coupling element allowing said second belt wheel to rotate at a fixed concentric position relative to said first belt wheel while generating a rotation of said inner cylindrical body about its longitudinal center axis.

4. The apparatus of claim 1, wherein said longitudinal center axis of said eccentric cylindrical hole of said outer cylindrical body is radially offset from said longitudinal center axis of said outer cylindrical body a first distance which is equal to a second distance between said longitudinal center axis of said eccentric cylindrical hole of said inner cylindrical body and said longitudinal center axis of said inner cylindrical body.

* * * * *

UNITED STATES PATENT AND TRADEMARK OFFICE
CERTIFICATE OF CORRECTION

PATENT NO. : 6,663,327 B2
DATED : December 16, 2003
INVENTOR(S) : Linderholm et al.

It is certified that error appears in the above-identified patent and that said Letters Patent is hereby corrected as shown below:

Column 3,
Line 42, please delete "distance c", and substitute therefore -- distance e --.

Signed and Sealed this

Twenty-seventh Day of July, 2004

JON W. DUDAS
*Acting Director of the United States Patent and Trademark Office*